United States Patent
Horng et al.

(10) Patent No.: US 10,084,356 B2
(45) Date of Patent: Sep. 25, 2018

(54) MOTOR AND SEALING MEMBER THEREOF

(71) Applicant: SUNON ELECTRONICS(FOSHAN) CO., LTD., Foshan (CN)

(72) Inventors: Alex Horng, Kaohsiung (TW);
Tso-Kuo Yin, Kaohsiung (TW);
Sheng-Chieh Liang, Kaohsiung (TW)

(73) Assignee: Sunon Electronics (Foshan) Co., Ltd., Foshan (CN)

( * ) Notice: Subject to any disclaimer, the term of this patent is extended or adjusted under 35 U.S.C. 154(b) by 359 days.

(21) Appl. No.: 15/009,887

(22) Filed: Jan. 29, 2016

(65) Prior Publication Data

US 2016/0248294 A1   Aug. 25, 2016

(30) Foreign Application Priority Data

Feb. 25, 2015   (TW) .............................. 104106027 A

(51) Int. Cl.
*H02K 5/12* (2006.01)
*H02K 5/10* (2006.01)
*H02K 7/14* (2006.01)

(52) U.S. Cl.
CPC .................. *H02K 5/10* (2013.01); *H02K 7/14* (2013.01)

(58) Field of Classification Search
CPC .......... H02K 5/132; H02K 5/10; H02K 5/124; H02K 5/136
USPC ..................................... 310/87–90
See application file for complete search history.

(56) References Cited

U.S. PATENT DOCUMENTS

| | | | |
|---|---|---|---|
| 5,061,868 A * | 10/1991 | Iwazaki | F16J 15/43 310/67 R |
| 2004/0140723 A1* | 7/2004 | Severien | H02K 5/10 310/90 |
| 2008/0056627 A1 | 3/2008 | Horng et al. | |
| 2012/0013214 A1* | 1/2012 | Isberg | F16C 19/522 310/90 |
| 2012/0112585 A1* | 5/2012 | Kajiura | F01L 1/10 310/83 |
| 2014/0183998 A1* | 7/2014 | Hoehle | H01R 39/12 310/88 |
| 2015/0152872 A1* | 6/2015 | Horng | F04D 17/16 415/208.1 |

(Continued)

FOREIGN PATENT DOCUMENTS

| | | |
|---|---|---|
| CN | 101752941 A | 6/2010 |
| CN | 201504139 U | 6/2010 |

(Continued)

*Primary Examiner* — Thanh Lam
(74) *Attorney, Agent, or Firm* — Alan D. Kamrath; Kamrath IP Lawfirm, P.A.

(57) ABSTRACT

A motor includes a housing, a stator and a rotor. The stator is received in the housing. The rotor includes a shaft and a permanent magnet. The shaft is rotatably coupled to the housing, and one end of the shaft extends out of the housing through a shaft hole. A gap is formed between the shaft and the shaft hole. The permanent magnet is coupled with the shaft and spaced from the stator. A sealing member is arranged on the housing and surrounds the shaft hole. The sealing member includes a blocking portion abutting with a predetermined part of the rotor outside the housing. The blocking portion seals the gap. As such, dustproof and damp-proof functions of the motor are improved.

25 Claims, 10 Drawing Sheets

(56) References Cited

U.S. PATENT DOCUMENTS

2015/0280512 A1* 10/2015 Nakazawa ............. H02K 5/124
310/88

FOREIGN PATENT DOCUMENTS

| CN | 201774347 U | 3/2011 |
|----|-------------|--------|
| CN | 201821210 U | 5/2011 |
| CN | 202004570 U | 10/2011 |
| CN | 202218092 U | 5/2012 |
| TW | I363471 B | 5/2012 |

* cited by examiner

MOTOR AND SEALING MEMBER THEREOF

CROSS REFERENCE TO RELATED APPLICATIONS

The application claims the benefit of Taiwan application serial No. 104106027, filed on Feb. 25, 2015, and the subject matter of which is incorporated herein by reference.

BACKGROUND OF THE INVENTION

1. Field of the Invention

The present invention generally relates to a motor and, more particularly, to a motor having a sealing member for achieving dustproof and damp-proof functions.

2. Description of the Related Art

A conventional motor generally includes components such as a rotor and a stator. Since several gaps are formed between these components, foreign debris such as dust or moisture may easily enter the motor through the gaps, thus causing damage to the motor and shortening the service life of the motor.

FIG. 1 shows a conventional motor 9 including a housing 91, a stator 92 and a rotor 93. The housing 91 is a hollow shell having a shaft tube 911. The stator 92 is fixed around the shaft tube 911 and is received in the housing 91. The rotor 93 is also received in the housing 91 and includes a shaft 931 rotatably coupled to the shaft tube 911. One end of the shaft 931 extends out of the housing 91 through a hole 912 located at the housing 91 for coupling with an impeller 94. As such, the housing 91 of the conventional motor 9 provides the dustproof function for the stator 92 and the rotor 93 received therein.

Although the dustproof function of the conventional motor 9 is achieved by arranging the stator 92 and the rotor 93 inside the housing 91, a gap is still formed between an outer circumferential surface of the shaft 931 and the hole 912 of the housing 91. Hence, dust and moisture may enter the housing 91 through the gap, thus damping the electronic components received in the housing 91 (such as the stator 92) and reducing the service life of the conventional motor 9. Such a conventional motor can be seen in Taiwan Patent No. 1363471.

In light of the above, it is necessary to improve the conventional motor.

SUMMARY OF THE INVENTION

It is therefore the objective of this invention to provide a motor for preventing dust and moisture from entering the motor, thus protecting the motor from damage.

It is another objective of this invention to provide a sealing member of a motor which efficiently prevents dust and moisture from entering the motor and is convenient to assemble.

The present invention provides a motor including a housing forming a shaft hole, a stator received in the housing, a rotor having a permanent magnet and a shaft, and a sealing member having a blocking portion. The shaft is rotatably coupled to the housing. One end of the shaft extends out of the housing through the shaft hole formed on the housing. A gap is formed between the shaft and the shaft hole. The permanent magnet is coupled with the shaft and spaced from the stator. The sealing member is arranged on the housing and surrounds the shaft hole. The blocking portion abuts against a predetermined part of the rotor outside the housing. The blocking portion seals the gap.

In a form shown, the sealing member is in a form of a ring made of a flexible material.

In a form shown, a free end of the blocking portion is in a form of a tip or an arcuate shape.

In a form shown, an engaging portion is formed around the shaft hole for engaging with the sealing member.

In a form shown, the engaging portion is in a form of an annular wall having a protrusion arranged on an outer circumferential surface of the annular wall for securely engaging with the sealing member.

In a form shown, the sealing member includes a first annular wall, a second annular wall and an interconnecting portion connecting the first annular wall and the second annular wall. A clamping room is formed between the first annular wall and the second annular wall, and the sealing member is coupled with the engaging portion of the housing via the clamping room.

In a form shown, a groove is formed on the first annular wall or the second annular wall, and the protrusion of the engaging portion is engaged with the groove.

In a form shown, the blocking portion extends from an inner circumferential surface of the first annular wall to form an annular flange abutting against an outer circumferential surface of the shaft.

In a form shown, the shaft is coupled with a coupling member. The coupling member includes a body having a plate and a lateral wall portion extending from a periphery of the plate. The lateral wall portion surrounds the sealing member and is spaced from the sealing member.

In a form shown, the end of the shaft extending out of the housing couples with an impeller.

In a form shown, the impeller includes a base securely coupled with the end of the shaft. A plurality of blades extends from a periphery of the base. A through-hole is formed on the base. A threaded hole is formed on the end of the shaft. A threading member extends through the through-hole and is screwed with the threaded hole for screwing the impeller to the end of the shaft.

In a form shown, the base of the impeller is coupled with the coupling member.

In a form shown, a plurality of mortises is formed on the base of the impeller, and a plurality of tenons is formed on the plate of the body of the coupling member. The plurality of tenons is engaged with the plurality of mortises.

In a form shown, the blocking portion extends from an outer circumferential surface of the second annular wall to form an annular flange abutting against the lateral wall portion of the coupling member.

In a form shown, the blocking portion is in a form of two annular flanges. One of the two annular flanges extends from an inner circumferential surface of the first annular wall and abuts against an outer circumferential surface of the shaft, and another of the two annular flanges extends from an outer circumferential surface of the second annular wall and abuts against the lateral wall portion of the coupling member.

In a form shown, the blocking portion extends from an outer circumferential surface of the second annular wall portion facing the lateral wall portion to form an annular flange abutting against an end face of the lateral wall portion of the coupling member.

In a form shown, the blocking portion extends from the interconnecting portion to form an annular flange abutting against the plate of the coupling member.

In a form shown, the sealing member is in a form of a single annular wall coupling with the engaging portion of the housing.

The present invention further provides a sealing member of a motor including a blocking portion, a first annular wall, a second annular wall and an interconnecting portion connecting the first annular wall and the second annular wall. A clamping room is formed between the first annular wall and the second annular wall.

In a form shown, the sealing member is in a form of a ring made of a flexible material.

In a form shown, a free end of the blocking portion is in a form of a tip or an arcuate shape.

In a form shown, the blocking portion is arranged on the first annular wall.

In a form shown, the blocking portion is arranged on the second annular wall.

In a form shown, the sealing member includes two blocking portions arranged on the first annular wall and the second annular wall, respectively.

In a form shown, the blocking portion is arranged on the interconnecting portion.

In a form shown, a groove is arranged on the first annular wall or the second annular wall.

In the motor of the present invention, due to the sealing member arranged on the housing, dust and moisture are prevented from entering the housing.

The electronic components such as the stator are prevented from dust accumulation and damping. The dustproof and damp-proof functions are improved, and the service life of the motor is prolonged.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
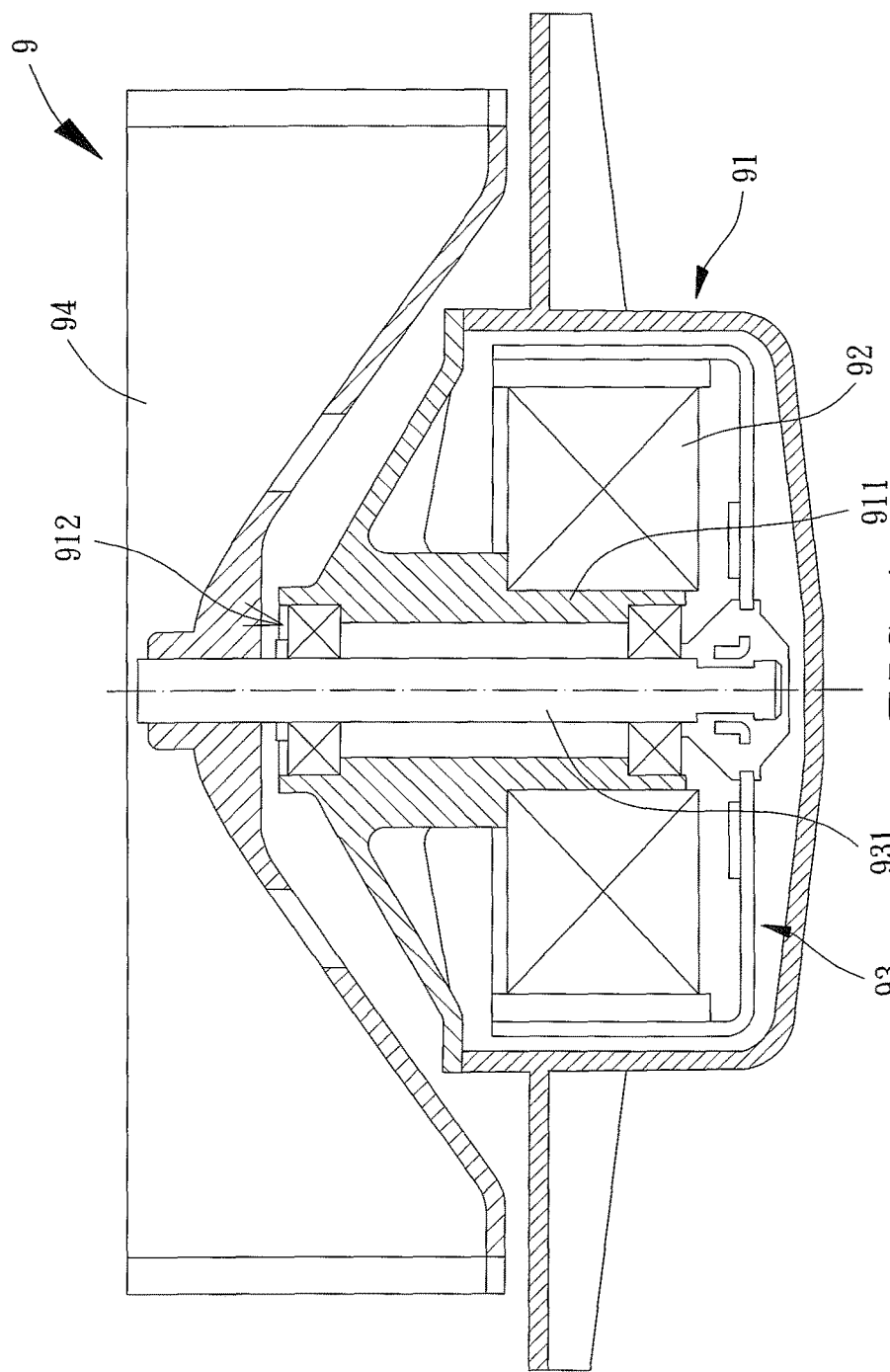
FIG. 1 is a cross sectional view of a conventional motor.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Figure 2:
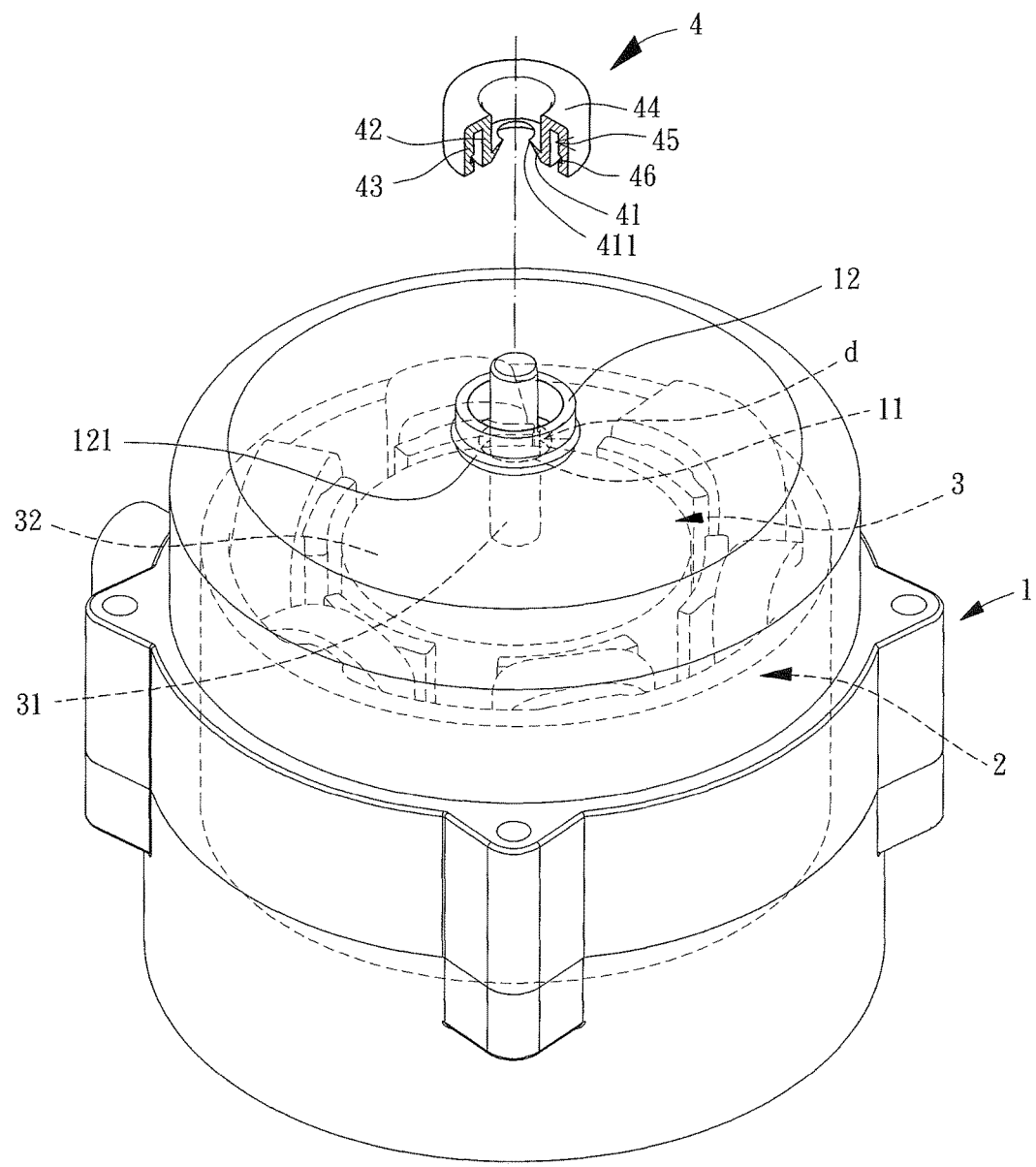
FIG. 2 is an exploded view of a motor according to a first embodiment of the present invention.

FIG. 2 shows a motor of the present invention including a housing 1, a stator 2, a rotor 3 and a sealing member 4. The housing 1 can be a hollow shell made of metal or plastic for receiving the stator 2 and the rotor 3. The outline of the housing 1 is not limited in the present invention. The type of the motor received in the housing 1 (i.e. the arrangement of the stator 2 and the rotor 3) can be of an inner rotor type or an outer rotor type. The stator 2 is received in the housing 1 by press fitting, fastening or screwing. The rotor 3 includes a shaft 31 and a permanent magnet 32, with the shaft 31 rotatably coupled to a predetermined position of the housing 1. As an example, the shaft 31 can be coupled to a pivoting portion formed in the housing, as it would be appreciated by a person ordinarily skilled in the art. The permanent magnet 32 is coupled with the shaft 31 and spaced from the stator 2. Thus, an alternating magnetic field is formed when the stator is electrified for driving the rotor 3 to rotate.

At least one end of the shaft 31 of the rotor 3 extends out of the housing 1. Specifically, the shaft 31 may include one end or two opposite ends each extending out of the housing 1. In this embodiment, a shaft hole 11 is arranged on the housing 1, and one end of the shaft 31 extends out of the housing 1 through the shaft hole 11.

Figure 3:
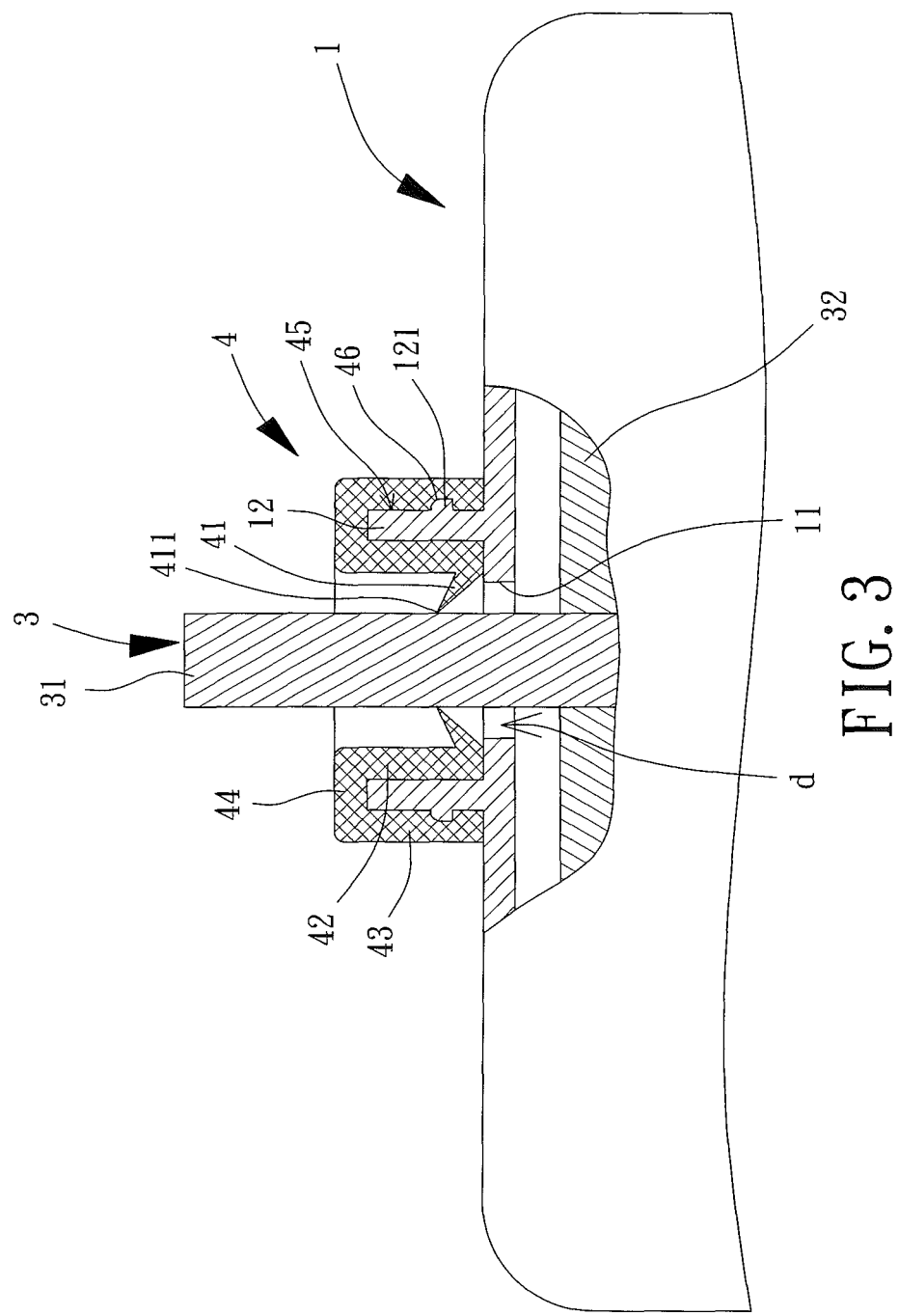
FIG. 3 is a partial cross sectional view of the motor according to the first embodiment of the present invention.

Please refer to FIGS. 2 and 3, the sealing member 4 of the motor of the present invention is coupled around the shaft hole 11 of the housing, and the end of the shaft 31 penetrates the sealing member 4. A gap "d" is formed between an outer circumferential surface of the shaft 31 and an inner circumferential surface of the shaft hole 11 to ensure smooth rotation of the shaft. The sealing member 4 may be coupled to the housing 1 by press fitting, screwing or fastening. Alternatively, the sealing member 4 may be integrally formed on the housing 1. The sealing member 4 includes at least one blocking portion 41 abutting against at least a predetermined part of the rotor 3 outside the housing 1 for sealing the gap "d," which would be described later.

Figure 4:
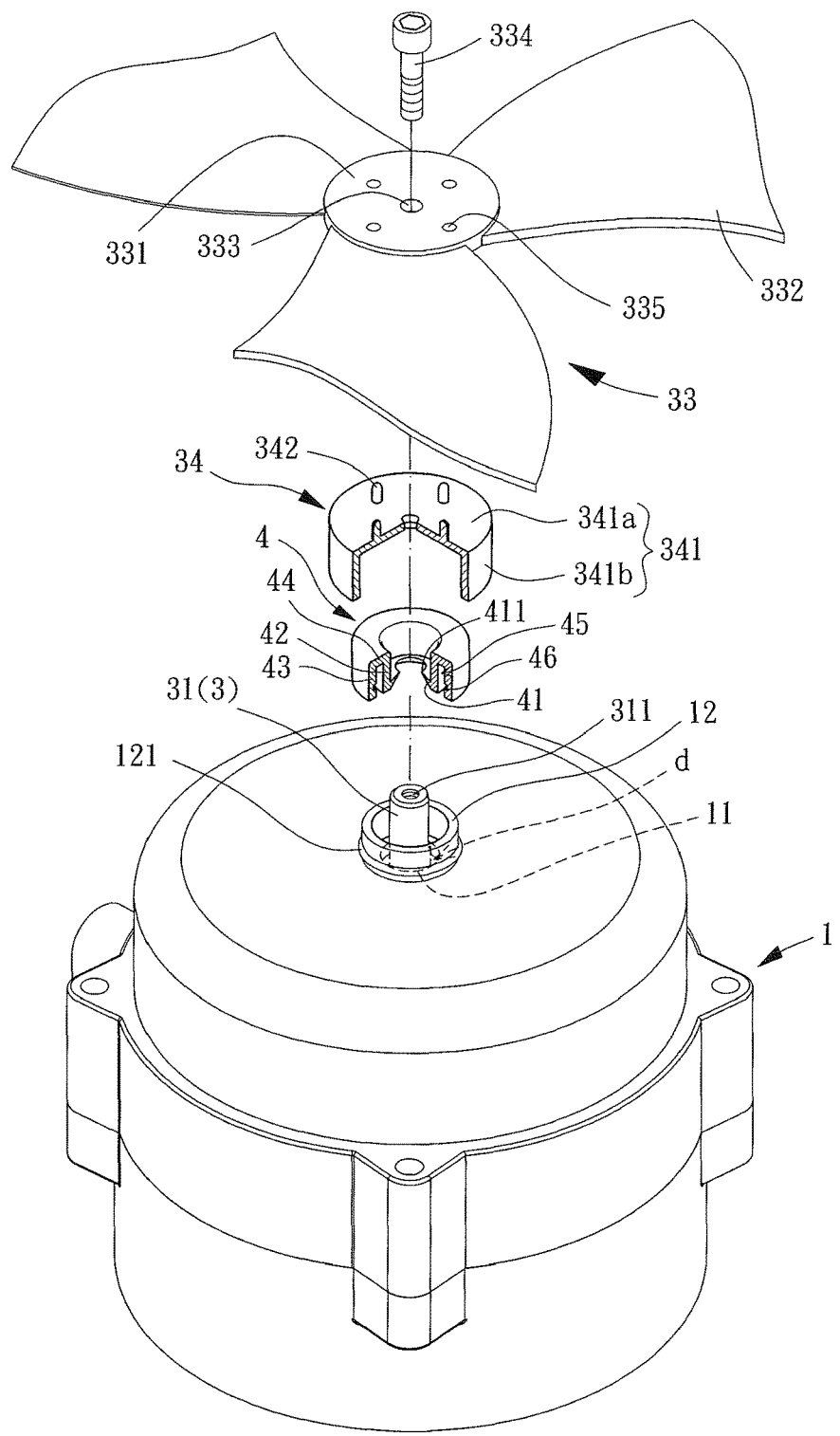
FIG. 4 is an exploded view of a motor according to a second embodiment of the present invention.

In this embodiment, the sealing member 4 may be in the form of an annular flange made of a flexible material such as rubber. As such, the rotation of the rotor 3 will not be affected when the blocking portion 4 abuts against the predetermined part of the rotor 3. As shown in FIG. 3, a tip 411 is formed on the free end of the blocking portion 41 and abuts against the shaft 31 of the rotor 3. The tip 411 may alternatively be in an arcuate form for reducing the friction between the blocking portion 41 and the rotor 3 and for improving the rotational stability of the motor. Moreover, an engaging portion 12 may be formed around the shaft hole 11 for coupling the sealing member 4 with the housing 1. The engaging portion 12 may be in the form of an annular wall as shown in FIGS. 3 and 4. The engaging portion 12 includes a protrusion 121 arranged on an outer circumferential wall of the engaging portion 12 for the sealing member 4 to be securely engaged with the housing 1. The sealing member 4 includes a first annular wall 42 and a second annular wall 43 through which the shaft 31 extends. The sealing member 4 further includes an interconnecting portion 44 for connecting the first annular wall 42 with the second annular wall 43. A clamping room 45 is formed between the first annular wall 42 and the second annular wall 43 for insertion of the engaging portion 12. Therefore, the sealing member 4 is engaged with the housing 1. In a preferred form, the second annular wall 43 further includes a groove 46 arranged on an inner circumferential wall of the second annular wall 43. The protrusion 121 of the engaging portion 12 is engaged with the groove 46 for enhancing the engagement between the sealing member 4 and the engaging portion 12 of the housing 1. Alternatively, the groove 46 may be arranged on the first annular wall 42 when the protrusion 121 is formed on an inner circumferential wall of the engaging portion 12.

However, it is not to be taken as a limited sense. As such, the sealing member 4 can be securely engaged to the engaging portion 12 of the housing 1, and convenient assembly of the sealing member 4 is provided.

By using the sealing member 4, the gap "d" of the motor is completely sealed as shown in FIG. 3. Thus, dust and moisture are prevented from entering the housing 1, and the dustproof and damp-proof functions are improved. Several embodiments of the present invention are presented below for describing the desired technical effects of sealing the gap "d" with the sealing member 4 as well as abutting the blocking portion 41 of the sealing member 4 with a predetermined part of the rotor 3.

FIG. 3 shows the motor according a first embodiment of the present invention. The blocking portion 41 is located at the first annular wall 42 and abuts against the shaft 31 (which is the predetermined part of the rotor 3 in this embodiment). Specifically, the blocking portion 41 extends from an inner circumferential surface of the first annular wall 42 facing the shaft 31 in order to form an annular flange. The annular flange extends toward the shaft 31 and abuts against the outer circumferential surface of the shaft 31. In this arrangement, the blocking portion 41 is located above the gap "d" for completely sealing the gap "d" along a radial direction of the shaft 31. Thus, dust and moisture are efficiently prevented from entering the housing 1, and the dustproof and damp-proof functions are improved.

Figure 5:
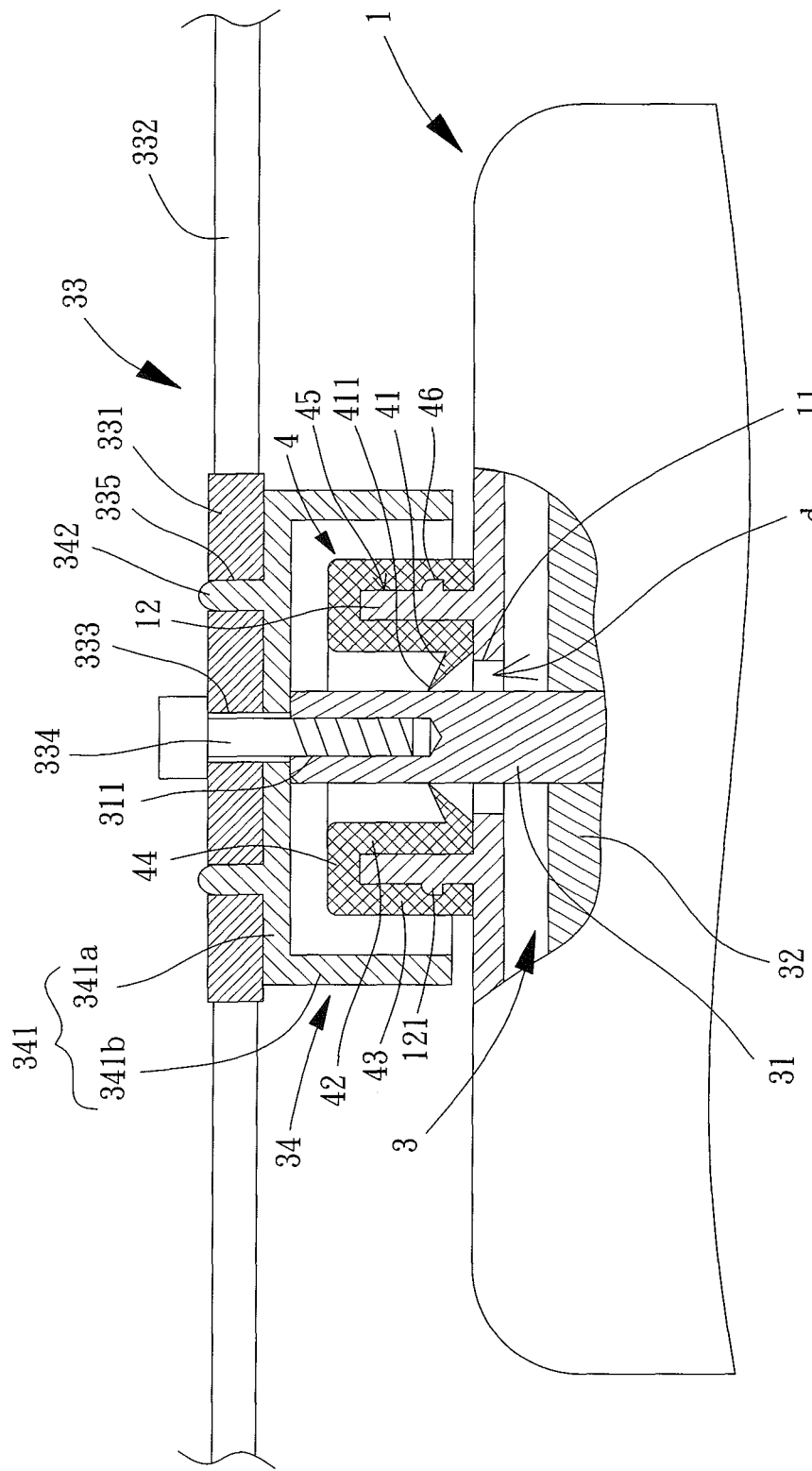
FIG. 5 is a partial cross sectional view of the motor according to the second embodiment of the present invention.

FIGS. 4 and 5 show a motor according to a second embodiment of the present invention. The blocking portion 41 is also arranged on the first annular wall 42 and abuts against the shaft 31 (which is the predetermined part of the rotor 3 in this embodiment). The second embodiment differs from the first embodiment in that an impeller 33 is securely coupled to the end of the shaft 31 extending out of the housing 1 by screwing, fastening or welding. The impeller 33 preferably includes a base 331 securely coupled to the end of the shaft 31. A plurality of blades 332 is formed on a periphery of the base 331, and a through-hole 333 is arranged on the center of the base 331. In addition, a threaded hole 311 is arranged on the end of the shaft 31 for screwing the impeller 33 to the end of the shaft 31 via a threading member 334 extending through the through-hole 333. Hence, when the impeller 33 rotates with the shaft 31, air flow is generated for cooling purposes.

In the second embodiment described above, the shaft 31 may be coupled with a coupling member 34, and the coupling member 34 may further be coupled to the base 331 of the impeller 33 via a surface of the base 331 facing the housing 1. Since the coupling member 34 rotates with the rotor 3, it is understood that the coupling member 34 is a part of the rotor 3. The threading member 334 extends through the coupling member 34 and engages with the shaft 31. As an example, the coupling member 34 is coupled to the base 331 by fastening, screwing or welding. Alternatively, the coupling member 34 can be directly coupled with the end of the shaft 31 by the threading member 334 even if the end of the shaft is not coupled with the impeller 33. That is, the coupling member 34 does not necessarily have to be coupled with the base 331 of the impeller 33 only. In this embodiment, a plurality of mortises 335 is arranged on the base 331. The coupling member 34 includes a body 341 having a plate 341a and a lateral wall portion 341b extending from a periphery of the plate 341a. A plurality of tenons 342 is arranged on the plate 341a for coupling with the plurality of mortises 335 of the base 331. Thus, the plate 341a of the coupling member 34 is coupled with the base 331. Since the lateral wall portion 341b surrounds the sealing member 4, the coupling member 34 and the sealing member 4 may jointly enhance the dustproof and damp-proof functions for efficiently preventing dust and moisture from entering the motor along the radial direction of the shaft 31. It is noted that the lateral wall portion 341b is spaced from the sealing member 4. The lateral wall portion 341b is not physically in contact with the housing 1, so as not to affect the rotation of the impeller 33.

Figure 6:
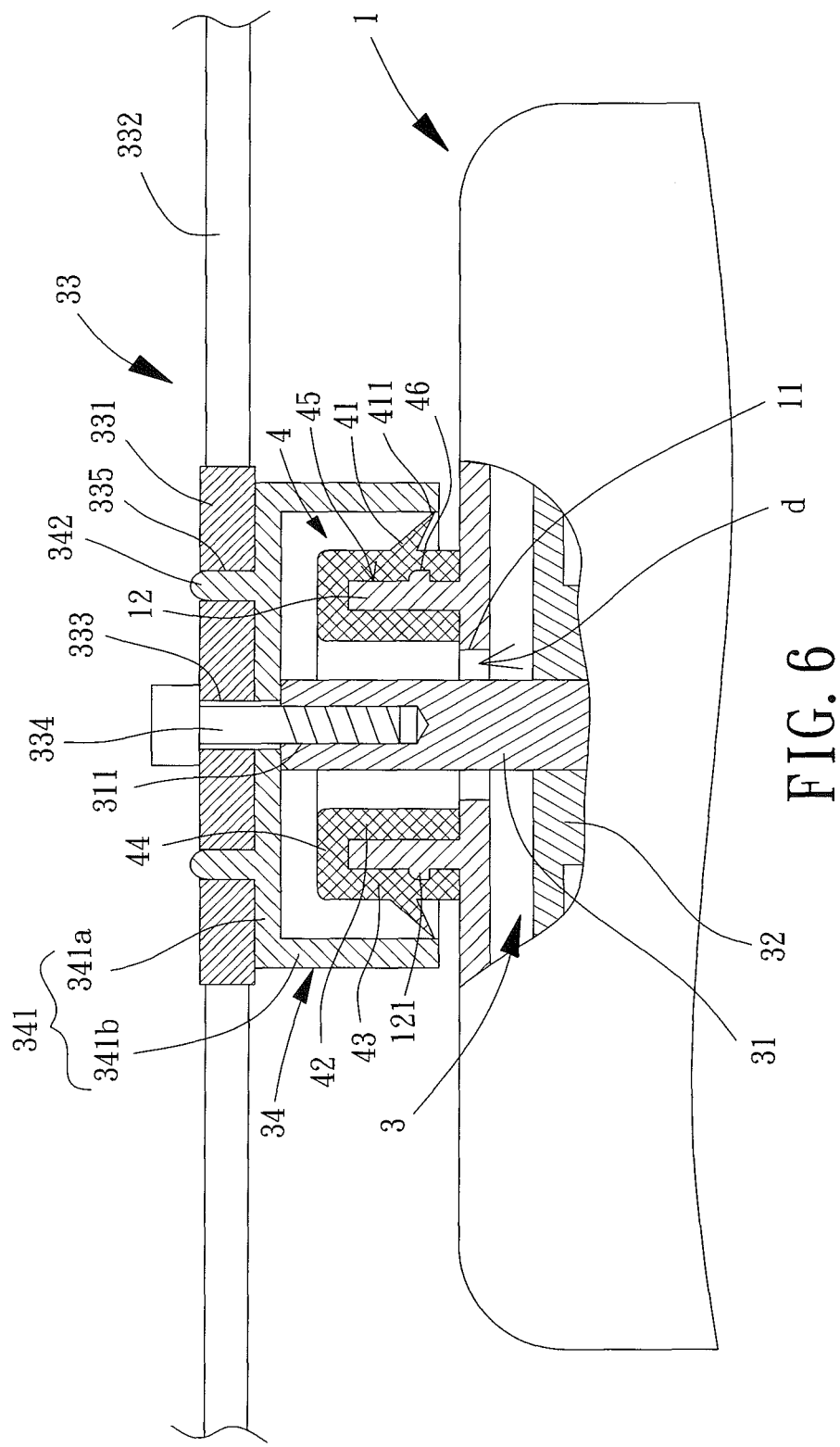
FIG. 6 is a partial cross sectional view of the motor according to a third embodiment of the present invention.

FIG. 6 shows a motor according to a third embodiment of the present invention. The blocking portion 41 is arranged on the second annular wall 43 and abuts against the coupling member 34 (which is the predetermined part of the rotor 3 in this embodiment). Specifically, the blocking portion 41 extends from the outer circumferential surface of the second annular wall 43 facing the lateral wall portion 341b of the coupling member 34 in order to form an annular flange. The annular flange extends toward the lateral wall portion 341b of the coupling member 34 and abuts against the lateral wall portion 341b. As such, the blocking portion 41 completely seals a space formed between the coupling member 34 and the second annular wall 43 and prevents dust and moisture from entering the housing 1. In comparison with the first and second embodiments, the dustproof and damp-proof functions are still achieved in this embodiment even when the blocking portion 41 does not abut against the shaft 31, thus further assuring the rotational stability of the shaft 31.

Figure 7:
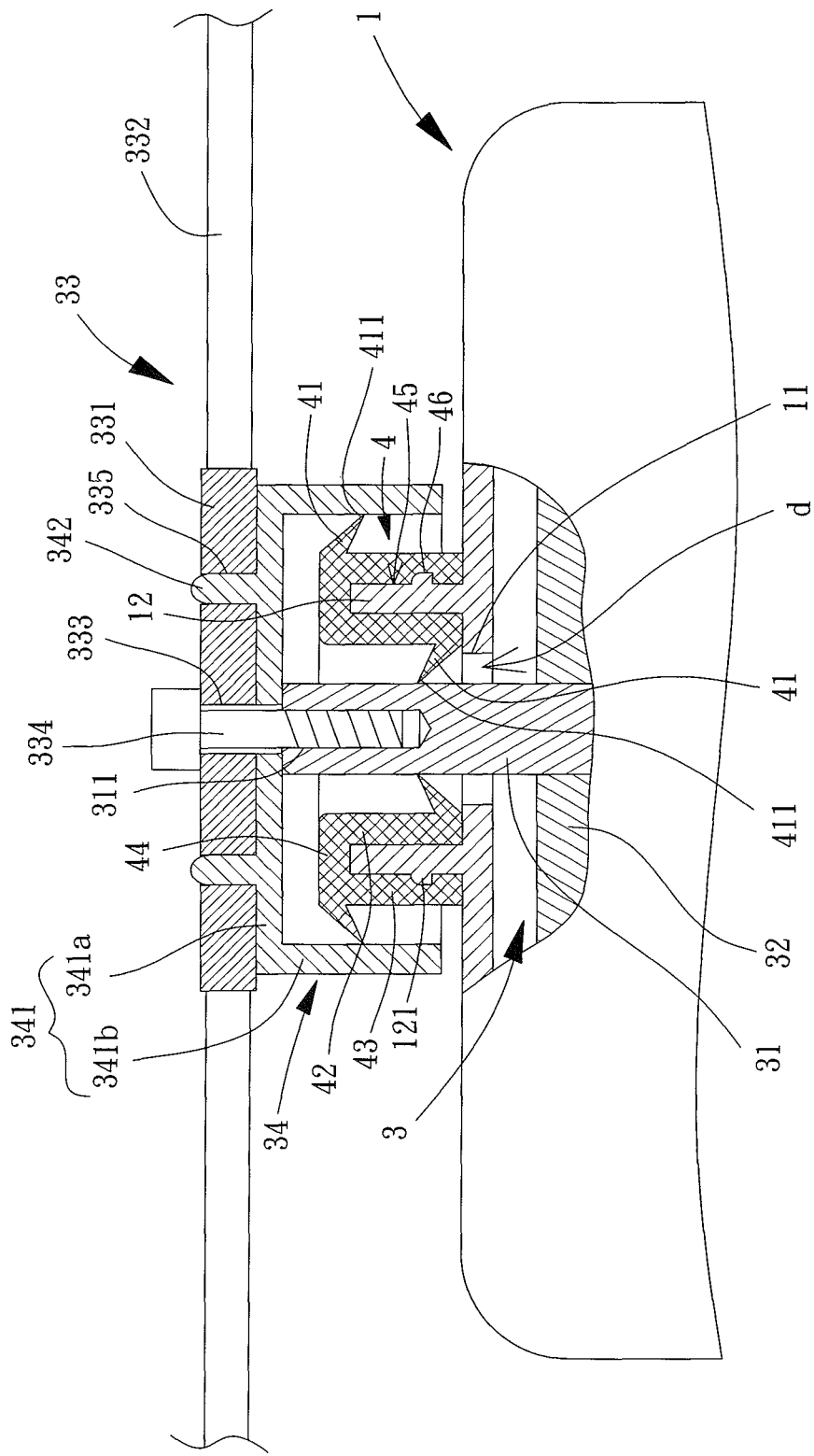
FIG. 7 is a partial cross sectional view of the motor according to a fourth embodiment of the present invention.

FIG. 7 shows a motor according to a fourth embodiment of the present invention. The blocking portion 41 is in the form of two annular flanges each abutting against a predetermined part of the rotor 3. One of the two annular flanges extends from the inner circumferential surface of the first annular wall 42 and abuts against the outer circumferential surface of the shaft 31 (which is one of the predetermined parts of the rotor 3 in this embodiment). Another annular flange extends from the outer circumferential surface of the second annular wall 43 and abuts against the lateral wall portion 341b of the coupling member 34 (which is another predetermined part of the rotor 3 in this embodiment). As such, the sealing effect is significantly improved, thus achieving excellent dustproof and damp-proof functions.

Figure 8:
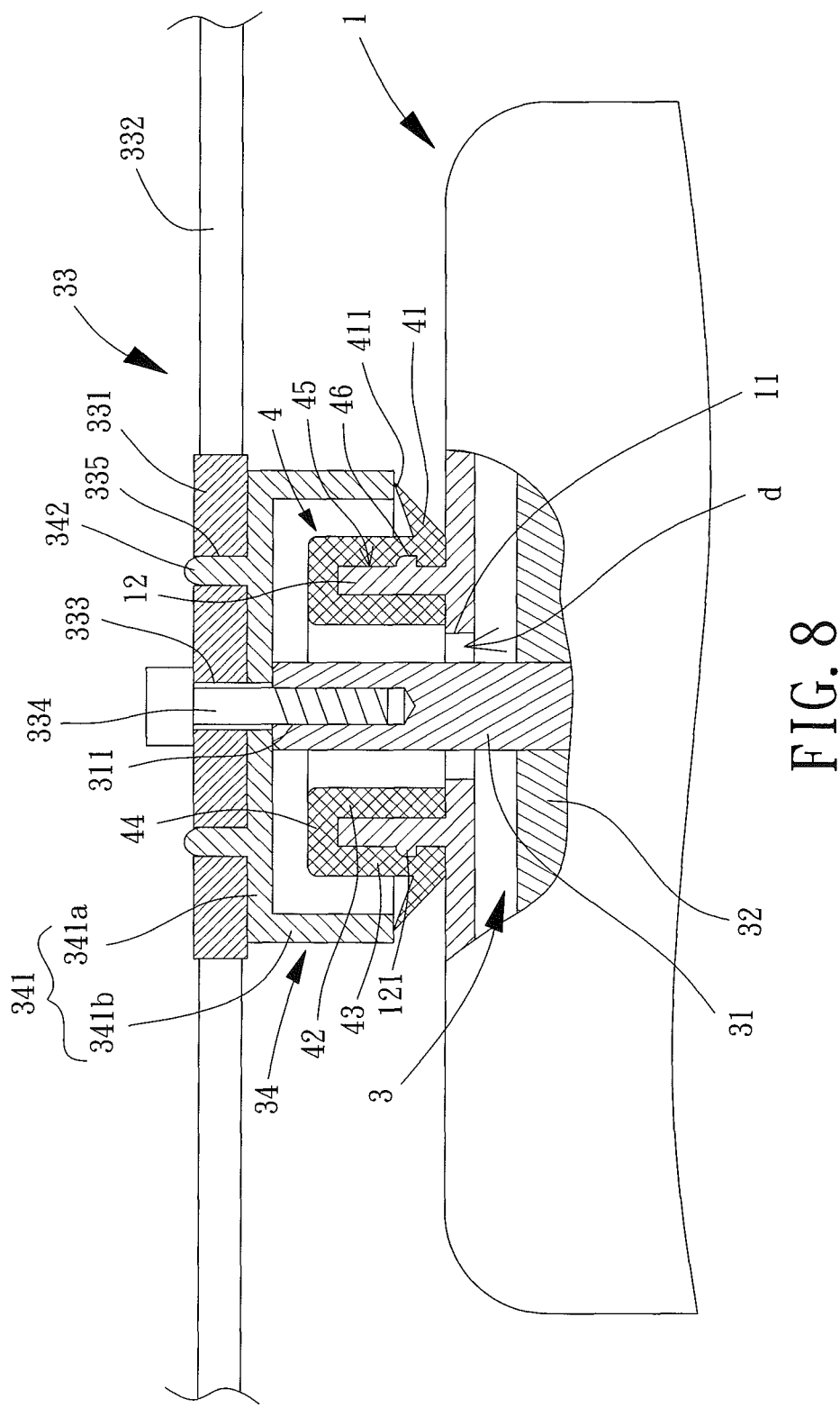
FIG. 8 is a partial cross sectional view of the motor according to a fifth embodiment of the present invention.

FIG. 8 shows a motor according to a fifth embodiment of the present invention. The blocking portion 41 is arranged on the second annular wall 43 and abuts against the coupling member 34 (which is the predetermined part of the rotor 3 in this embodiment). Specifically, the blocking portion 41 extends from the outer circumferential surface of the second annular wall 43 facing the lateral wall portion 341b of the coupling member 34 in order to form an annular flange. The annular flange abuts against an end face of the lateral wall portion 341a, thus achieving the dustproof and damp-proof functions. Besides, the blocking portion 41 bears the weight of the coupling member 34. Hence, when the coupling member 34 rotates with the rotor 3, the blocking portion 41 that is made of rubber serves as a buffer for improving the rotational stability of the rotor 3.

Figure 9:
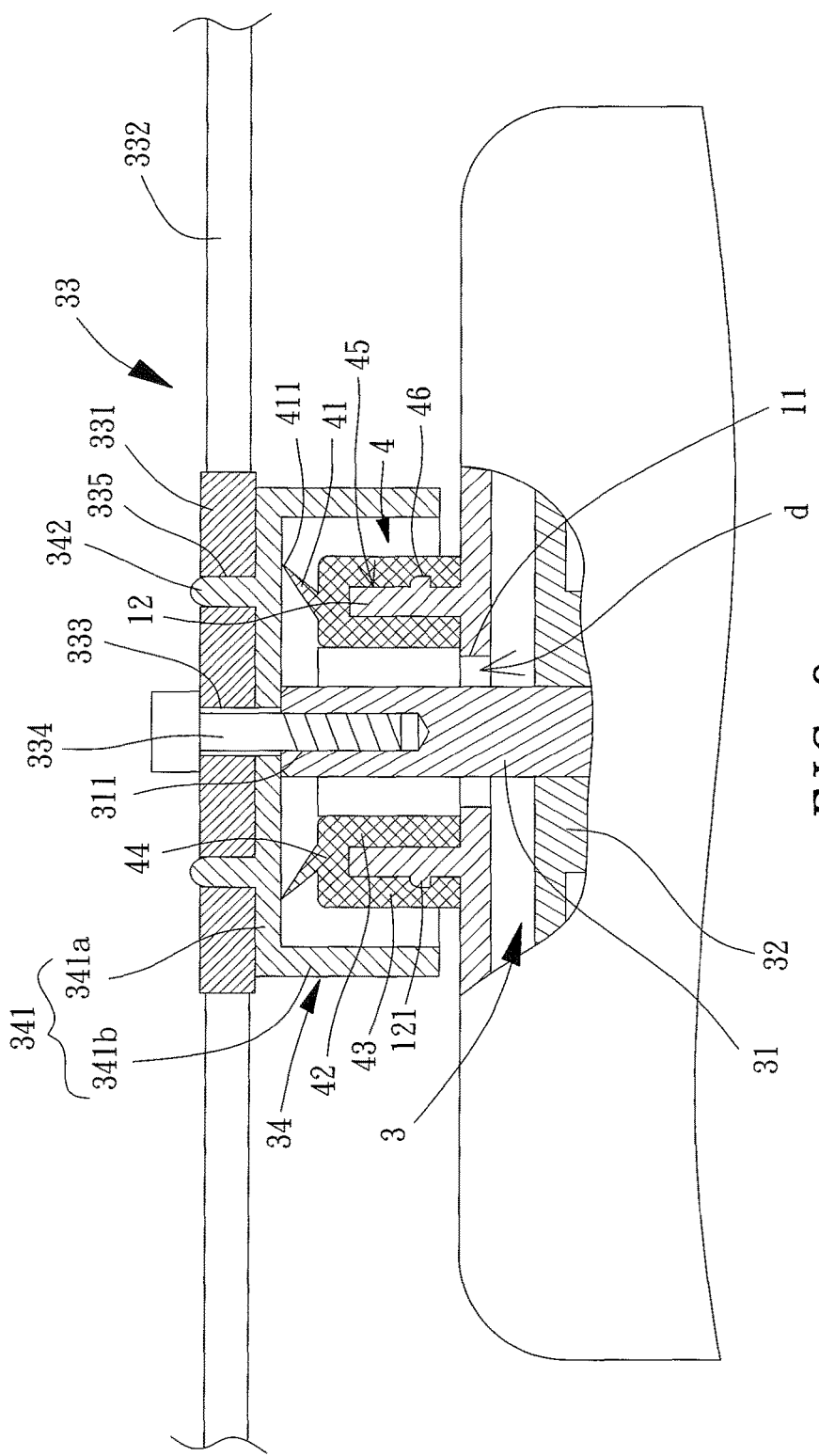
FIG. 9 is a partial cross sectional view of the motor according to a sixth embodiment of the present invention.

FIG. 9 shows a motor according to a sixth embodiment of the present invention. The blocking portion 41 is arranged on the interconnecting portion 44 and abuts against the coupling member 34 (which is the predetermined part of the rotor 3 in this embodiment). Specifically, the blocking portion 41 extends from the interconnecting portion 44 in order to form an annular flange abutting with a bottom surface of the plate 341a of the coupling member 34. Thus, the dustproof and damp-proof functions are achieved, and the blocking portion 41 further bears the weight of the coupling member 34. Hence, when the coupling member 34 rotates with the rotor 3, the blocking portion 41 that is made of rubber serves as a buffer for improving the rotational stability of the rotor 3.

Figure 10:
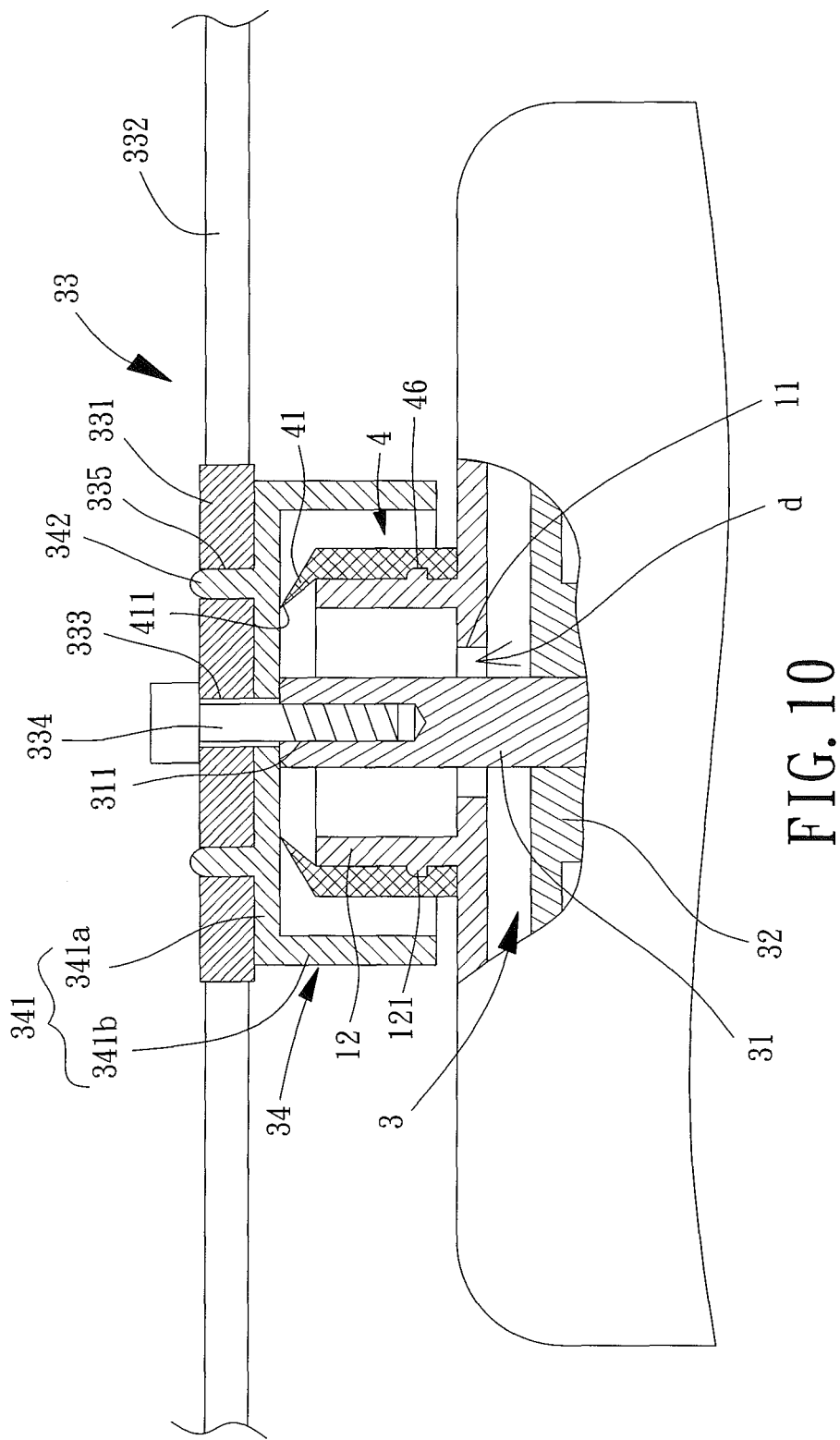
FIG. 10 is a partial cross sectional view of the motor according to a seventh embodiment of the present invention.

FIG. 10 shows a motor according to a seventh embodiment of the present invention. The sealing member 4 is in the form of a single annular wall, and is coupled to the protrusion 121 of the engaging portion 12 by fastening. Instead, the sealing member may be coupled with the engaging portion 12 by screwing or adhesion. In comparison with the sealing member 4 including the first annular wall 42 and the second annular wall 43 described above, the structure of the sealing member 4 disclosed in the seventh embodiment is simpler, and the assembly of the sealing member 4 is also easier.

In the motor of the present invention, due to the sealing member 4 arranged on the housing 1, dust and moisture are prevented from entering the housing 1. The accumulation of dust on the electronic components such as the stator 2, as well as damping of said components, are prevented. The dustproof and damp-proof functions are improved, and the service life of the motor is prolonged.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A motor comprising:
   a housing having a shaft hole;
   a stator received in the housing;
   a rotor having a permanent magnet and a shaft rotatably coupled to the housing, wherein one end of the shaft extends out of the housing through the shaft hole of the housing, wherein a gap is formed between the shaft and the shaft hole, and wherein the permanent magnet is coupled with the shaft and spaced from the stator; and
   a sealing member having a blocking portion, wherein the sealing member is arranged on the housing and surrounds the shaft hole, wherein the blocking portion abuts against a predetermined part of the rotor outside the housing, and wherein the blocking portion seals the gap.

2. The motor as claimed in claim 1, wherein the sealing member is in a form of a ring made of a flexible material.

3. The motor as claimed in claim 1, wherein a free end of the blocking portion is in a form of a tip or an arcuate shape.

4. The motor as claimed in claim 1, wherein an engaging portion is formed around the shaft hole for engaging with the sealing member.

5. The motor as claimed in claim 4, wherein the engaging portion is in a form of an annular wall having a protrusion arranged on an outer circumferential surface of the annular wall for securely engaging with the sealing member.

6. The motor as claimed in claim 5, wherein the sealing member comprises a first annular wall, a second annular wall and an interconnecting portion connecting the first annular wall and the second annular wall, wherein a clamping room is formed between the first annular wall and the second annular wall, and wherein the sealing member is coupled with the engaging portion of the housing via the clamping room.

7. The motor as claimed in claim 6, wherein a groove is formed on the first annular wall or the second annular wall, and wherein the protrusion of the engaging portion is engaged with the groove.

8. The motor as claimed in claim 6, wherein the blocking portion extends from an inner circumferential surface of the first annular wall to form an annular flange abutting against an outer circumferential surface of the shaft.

9. The motor as claimed in claim 6, wherein the shaft is coupled with a coupling member, wherein the coupling member comprises a body having a plate and a lateral wall portion extending from a periphery of the plate, and wherein the lateral wall portion surrounds the sealing member and is spaced from the sealing member.

10. The motor as claimed in claim 9, wherein the one end of the shaft extending out of the housing couples with an impeller.

11. The motor as claimed in claim 10, wherein the impeller comprises a base securely coupled with the one end of the shaft, wherein a plurality of blades extends from a periphery of the base, wherein a through-hole is formed on the base, wherein a threaded hole is formed on the one end of the shaft, and wherein a threading member extends through the through-hole and is screwed with the threaded hole for screwing the impeller to the one end of the shaft.

12. The motor as claimed in claim 11, wherein the base of the impeller is coupled with the coupling member.

13. The motor as claimed in claim 12, wherein a plurality of mortises is formed on the base of the impeller, wherein a plurality of tenons is formed on the plate of the body, and wherein the plurality of tenons is engaged with the plurality of mortises.

14. The motor as claimed in claim 12, wherein the blocking portion extends from an outer circumferential surface of the second annular wall to form an annular flange abutting against the lateral wall portion of the coupling member.

15. The motor as claimed in claim 12, wherein the blocking portion is in a form of two annular flanges, wherein one of the two annular flanges extends from an inner circumferential surface of the first annular wall and abuts against an outer circumferential surface of the shaft, and wherein another one of the two annular flanges extends from an outer circumferential surface of the second annular wall and abuts against the lateral wall portion of the coupling member.

16. The motor as claimed in claim 12, wherein the blocking portion extends from an outer circumferential surface of the second annular wall facing the lateral wall portion to form an annular flange abutting against an end face of the lateral wall portion of the coupling member.

17. The motor as claimed in claim 12, wherein the blocking portion extends from the interconnecting portion to form an annular flange abutting against the plate of the coupling member.

18. The motor as claimed in claim 4, wherein the sealing member is in a form of a single annular wall coupling with the engaging portion of the housing.

19. A sealing member of a motor, comprising:
    a blocking portion;
    a first annular wall;
    a second annular wall; and
    an interconnecting portion connecting the first annular wall and the second annular wall, wherein a clamping room is formed between the first annular wall and the second annular wall, and wherein the blocking portion is arranged on the interconnecting portion.

20. The sealing member of the motor as claimed in claim 19, wherein the sealing member is in a form of a ring made of a flexible material.

21. The sealing member of the motor as claimed in claim 19, wherein a free end of the blocking portion is in a form of a tip or an arcuate shape.

22. The sealing member of the motor as claimed in claim 19, wherein the blocking portion is arranged on the first annular wall.

23. The sealing member of the motor as claimed in claim 19, wherein the blocking portion is arranged on the second annular wall.

24. The sealing member of the motor as claimed in claim 19, wherein the sealing member comprises two blocking portions arranged on the first annular wall and the second annular wall, respectively.

25. The sealing member of the motor as claimed in claim 19, wherein a groove is arranged on the first annular wall or the second annular wall.

* * * * *